US011356740B2

(12) United States Patent
Callow et al.

(10) Patent No.: US 11,356,740 B2
(45) Date of Patent: Jun. 7, 2022

(54) MODULAR USER INTERFACE FOR VIDEO DELIVERY SYSTEM

(71) Applicant: HULU, LLC, Santa Monica, CA (US)

(72) Inventors: Trevor Callow, Venice, CA (US); Mike Avitabile, Venice, CA (US); Erika Palmer, Seattle, WA (US); Matthew Chun, Seattle, WA (US); Lena Bareket, Culver City, CA (US); Linda Sum, Rancho Santa Margarita, CA (US); Darshana Umakanth, Los Angeles, CA (US); Dominic Hopton, Kirkland, WA (US); Jason Wong, Pacific Palisades, CA (US); Yu Zhao, Beijing (CN); Heather Cho, Los Angeles, CA (US); Zachary Hinton, Raleigh, NC (US); Josh Maldonado, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/322,203

(22) Filed: May 17, 2021

(65) Prior Publication Data

US 2021/0368240 A1    Nov. 25, 2021

Related U.S. Application Data

(60) Provisional application No. 63/027,197, filed on May 19, 2020, provisional application No. 63/033,650, filed on Jun. 2, 2020.

(51) Int. Cl.
*H04N 21/475* (2011.01)
*H04N 21/258* (2011.01)
(Continued)

(52) U.S. Cl.
CPC ... *H04N 21/4755* (2013.01); *H04N 21/25891* (2013.01); *H04N 21/4312* (2013.01);
(Continued)

(58) Field of Classification Search
None
See application file for complete search history.

(56) References Cited

U.S. PATENT DOCUMENTS 6,081,263 A * 6/2000 LeGall ............... H04N 5/44543
715/760
7,139,983 B2 * 11/2006 Kelts ..................... H04N 7/165
715/802
(Continued)

FOREIGN PATENT DOCUMENTS

| KR | 1020090100847 A | 9/2009 |
| KR | 1020090120898 A | 11/2009 |
| KR | 1020140055849 A | 5/2014 |

OTHER PUBLICATIONS

International Search Report & Written Opinion for PCT Application PCT/US2021/032873 dated Sep. 10, 2021, 9 pages.

*Primary Examiner* — Alexander Q Huerta
(74) *Attorney, Agent, or Firm* — Kwan & Olynick LLP

(57) ABSTRACT

In some embodiments, a method selects a context for a user account and selects a plurality of collections for an interface. A collection includes a set of videos. The method selects a theme from a plurality of themes for a collection in the plurality of collections based on the context. The plurality of themes apply different display formats to the collection. The method sends an identifier for the theme and information for the collection to a client device being used by the user account to indicate to the interface the theme to use to display the collection with the plurality of collections.

20 Claims, 10 Drawing Sheets

(51) Int. Cl.
*H04N 21/466* (2011.01)
*H04N 21/431* (2011.01)
(52) U.S. Cl.
CPC ..... *H04N 21/4667* (2013.01); *H04N 21/4668* (2013.01); *H04N 21/4756* (2013.01)

(56) References Cited

U.S. PATENT DOCUMENTS

| | | | | |
|---|---|---|---|---|
| 9,980,007 | B1* | 5/2018 | Thompson | H04N 21/482 |
| 2007/0073904 | A1* | 3/2007 | Leung | H04N 21/440263 |
| | | | | 709/247 |
| 2008/0082922 | A1* | 4/2008 | Biniak | H04N 21/8405 |
| | | | | 715/719 |
| 2009/0158337 | A1* | 6/2009 | Stiers | H04N 21/235 |
| | | | | 725/44 |
| 2009/0313550 | A1* | 12/2009 | Kim | G06F 16/954 |
| | | | | 715/744 |
| 2010/0115557 | A1 | 5/2010 | Billmaier et al. | |
| 2010/0131983 | A1* | 5/2010 | Shannon | H04N 21/4314 |
| | | | | 725/46 |
| 2011/0066950 | A1* | 3/2011 | Wilson | G06F 9/451 |
| | | | | 715/744 |
| 2011/0231878 | A1* | 9/2011 | Hunter | H04N 21/47217 |
| | | | | 725/48 |
| 2013/0239001 | A1* | 9/2013 | Maloney | G06F 40/186 |
| | | | | 715/732 |
| 2014/0136935 | A1* | 5/2014 | Santillie | H04N 21/41415 |
| | | | | 715/204 |
| 2018/0070138 | A1* | 3/2018 | Chai | H04N 21/4312 |
| 2021/0136458 | A1* | 5/2021 | Carney | H04N 21/47202 |

\* cited by examiner

User interface
112-1

Collection #1 (high emphasis)
502-1

Collection #2 (low emphasis)
502-2

Collection #3 (high emphasis)
502-3

Collection #4 (medium emphasis)
502-4

Collection #5 (low emphasis)
502-5

FIG. 5A

User interface
112-2

Collection #1 (high emphasis)
502-1

Collection #2 (medium emphasis)
502-2

Collection #3 (low emphasis)
502-3

Collection #4 (high emphasis)
502-4

Collection #5 (low emphasis)
502-5

FIG. 5B

MODULAR USER INTERFACE FOR VIDEO DELIVERY SYSTEM

CROSS REFERENCE TO RELATED APPLICATIONS

Pursuant to 35 U.S.C. § 119(e), this application is entitled to and claims the benefit of the filing date of U.S. Provisional App. No. 63/027,197 filed May 19, 2020 and U.S. Provisional App. No. 63/033,650 filed Jun. 2, 2020, the content of all which are incorporated herein by reference in its entirety for all purposes.

BACKGROUND

Video content management systems (VCMS) traditionally focus on what content should be offered by an application. The application then displays the selected content in an interface to a user. The layout of the user interfaces are normally the same for a single user and typically all users. When there is a large amount of content to browse through, a user account may have a hard time selecting an instance of content to watch when the layout is static and does not change. Also, some user accounts may prefer different instances of content. However, the instances of content in the user interface may be displayed in the same layout for multiple user accounts event though some instances may be more relevant to some user accounts than others.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 5A and 5B depict different examples of personalized modular user interfaces according to some embodiments.

DETAILED DESCRIPTION

Figure 1:
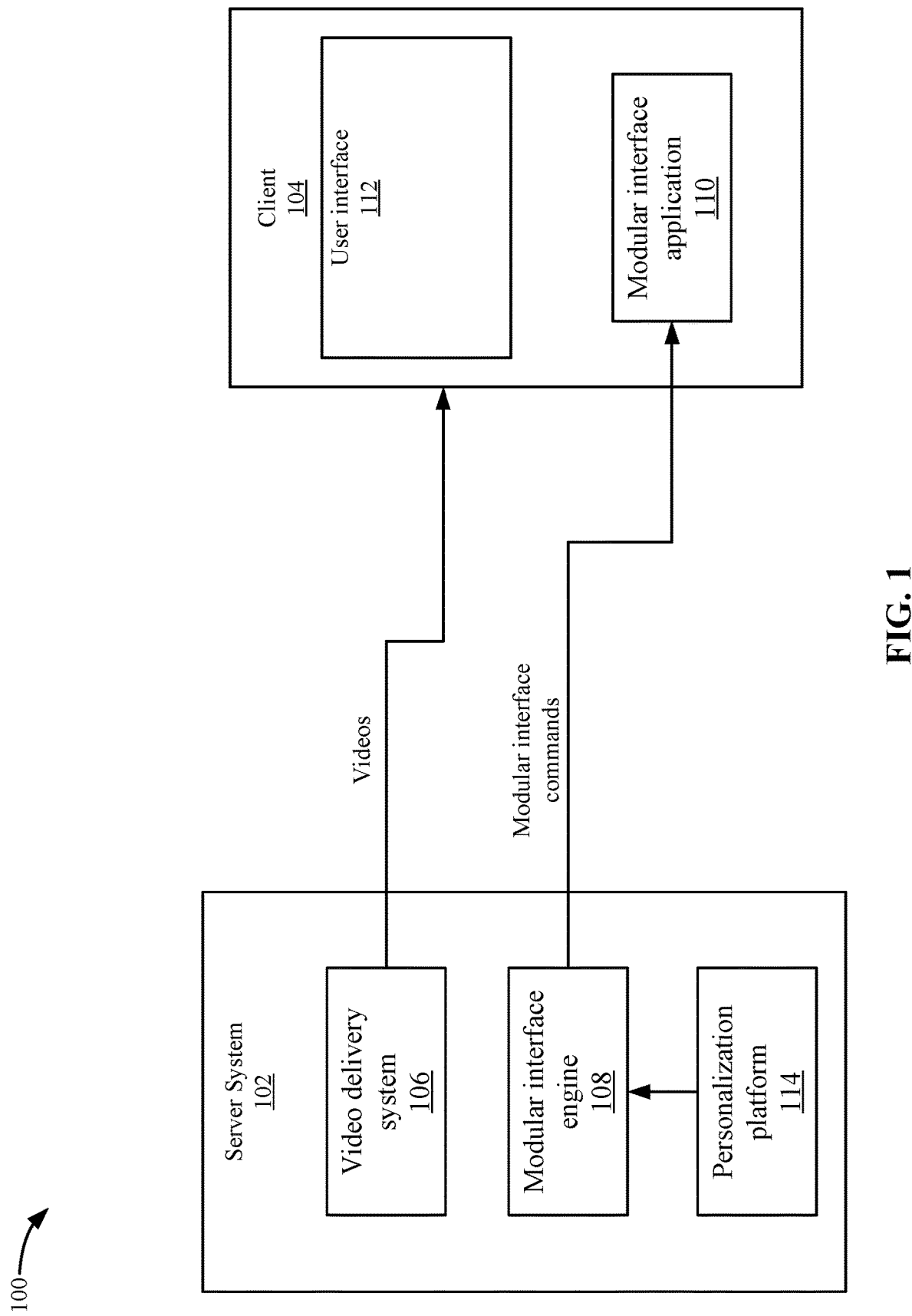
FIG. 1 depicts a simplified system for generating a modular user interface according to some embodiments.

Described herein are techniques for a user interface for a video delivery system. In the following description, for purposes of explanation, numerous examples and specific details are set forth to provide a thorough understanding of some embodiments. Some embodiments as defined by the claims may include some or all of the features in these examples alone or in combination with other features described below and may further include modifications and equivalents of the features and concepts described herein.

A system generates a modular user interface that can change how content is displayed in a user interface. The content may be organized into groups, referred to as "collections". The system may use the collections to organize content based on a similar characteristic among the content. The system overcomes the disadvantages of having a fixed layout on a user interface for a single user account and across multiple user accounts by changing the themes applied to the collections. For example, the system may apply different themes to a collection to change the layout for a single user account and across multiple user accounts. A theme may be a format of how the collection is displayed. The themes may display the collections with different emphasis on the content that is presented in the user interface.

The system may select the collections to display based on different conditions, such as based on user account preferences, viewing habits, user account inputs, or based on business goals. Then, the themes may be applied to the collections differently based on different conditions. For example, a theme for a collection may be fixed across multiple user accounts when a collection is considered highly relevant by a video delivery system where the theme may place more emphasis on the collection to multiple user accounts. Also, the themes may be applied differently per user account based on a metric, such as a user account's viewing behaviors and inputs so that collections that are highly relevant to a user account are given more emphasis on the interface. The system may also include text that explains, on a per user basis, why the system is recommending the content to that user account in a theme.

The modular user interface provides advantages because of the flexibility to configure and change how the user interface looks across devices and/or user accounts without requiring a software code update to the user interface application. Further, the modular user interface provides the ability to algorithmically personalize the user interface on a per user account basis to optimize engagement. The user interface is modular and may use a template that includes areas for collections to be displayed. Then, the user interface is flexible by allowing any collection to have any theme within the designated area. The user interface uses the templates to manage, change, and personalize the themes applied to collections across devices and/or user accounts.

System Overview

FIG. 1 depicts a simplified system 100 for generating a modular user interface according to some embodiments. System 100 includes a server system 102 and a client 104. Although one instance is shown, server system 102 may include multiple servers. Also, server system 102 may communicate with multiple clients 104 to provide modular user interfaces 112 to different clients 104. Also, different users (e.g., via user accounts or user profiles) may be using clients 104.

Server system 102 includes a video delivery system 106 that delivers videos to client 104. The videos may be from a library of videos offered by a video delivery service. Users may select the videos and have the videos played back on demand. Further, video delivery system 106 may provide live videos on a linear schedule.

Client 104 may include a computing device, such as a smartphone, set top box, tablet device, living room device, gaming console, personal computer, etc. Client 104 includes a media player (not shown) that can play the content. In some embodiments, user interface 112 may play the video in the media player, which is displayed on user interface 112.

User interface 112 may display content that is available to a user for playback. For example, user interface 112 may display the content prior to playback, and allow a user to select which content to play. Although the display of content that is available for playback is described, the modular aspect of user interface 112 may be used for other purposes, such as to display a page that includes different content to be emphasized with different themes.

The content may be organized in groups, such as collections of one or more videos. System 100 may generate the collections based on a characteristic so that each video of the collection may include the characteristic. For example, a collection may include videos that are defined as horror movies or videos that are defined as comedies. Collections may also be formed in other ways, such as randomly, by user account behavior, or user account inputs.

User interface 112 may be modular to allow for changes to the layout of the user interface. In contrast to a fixed layout, sections of user interface 112 may be changed to different formats as described below. The modularity of user interface 112 may be provided using templates, which may define different areas of user interface 112 for display of collections. The templates allow content in collections to be displayed differently in user interface 112. That is, the format that is used to display of the content may be dynamically changed in a template. The dynamic change may be performed upon a refresh of user interface 112. Accordingly, a user account may have the format for collections changed when certain conditions are met.

A modular interface engine 108 is used to configure the templates to allow flexibility to assign different themes and placement of content to optimally present content in user interface 112. The templates provide the ability to iterate on the design variations on theme design when different conditions are met, such as when metrics are met or based on machine learning outputs. Modular interface application 110 is configured to change themes for templates that are designed for insertion of content. Each template can support different themes. The software code of modular interface application 110 may not need to be changed to support the display of different themes. In contrast to conventional user interfaces that have a static single design layout, modular interface application 110 can dynamically change the layout design by having templates and independent collections. User interface 112 allows different themes to be applied to a single collection and also to multiple collections thereby improving the operation of the user interface over a fixed layout. This adaptive and modular design system uses templates to reduce programming changes on the programming side, while reducing operational cost to maintain and create numerous types of templates for each collection on the user interface.

The collections may be displayed with different themes, which may have different display formats. The display formats may display a collection differently, such as with different levels of information, in different sizes, or include other formatting differences, such as different actions e.g., 'Playback' vs. 'Browse' (Go to Details). In some examples, the themes may be referred to as themes with different levels of emphasis, such as a high emphasis theme, a medium emphasis theme, and a low emphasis theme. Each level of emphasis may include different formatting, such as each theme may display a different amount of data for an instance of content and may display a collection using different sizes.

A personalization platform 114 may personalize user interface 112 on a per user account basis. For example, personalization platform 114 may select collections and themes for collections. A theme for a collection may be selected based on different conditions. For example, personalization platform 114 may select a theme for a collection for all users, a portion of users, or for a single user. For a single user account, personalization platform 114 may analyze information for a user account to select a theme for a collection. For example, personalization platform 114 may select a high emphasis theme for a collection that is considered highly relevant to a user account. Also, personalization platform 114 may use information from other user accounts to select a theme for a collection for the user account. For example, personalization platform 114 may analyze global historical trends in user engagement with the themes to select a theme for a collection. For example, a highly relevant collection may be presented in a high emphasis theme across multiple accounts. The selection of a theme will be discussed in more detail below.

User interface 112 is designed to dynamically display collections based on an identified theme. For example, the theme used for a collection may be changed based on a modular interface command that is sent to client 104. The command may define the theme for a collection and may also include the information needed to display the content for the collection using the theme. Then, client 104 may display the collection based on the specified theme.

Modular User Interface Examples

Figure 2A:
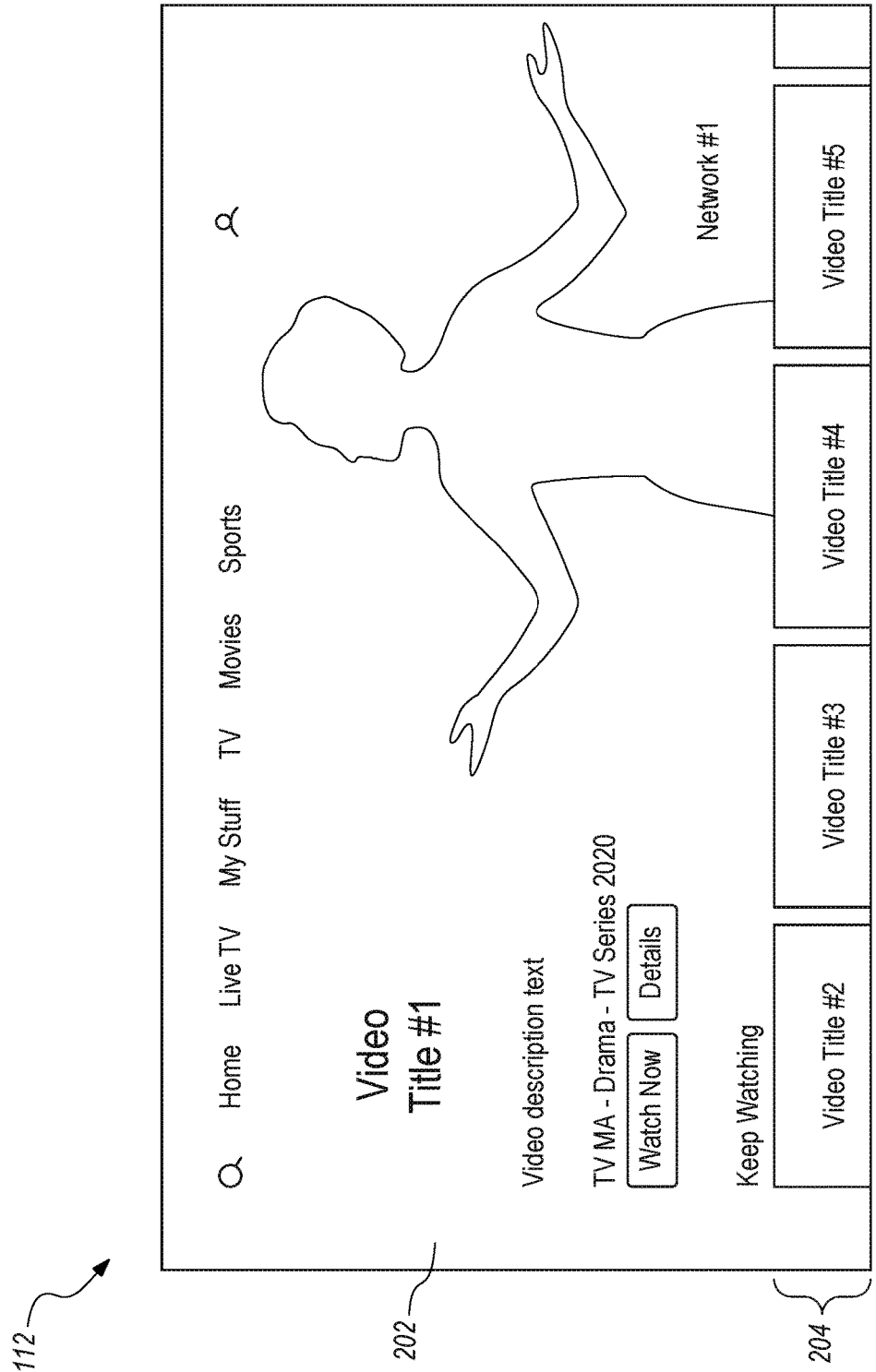
FIG. 2A depicts an example of a first type of modular user interface according to some embodiments.
Figure 2B:
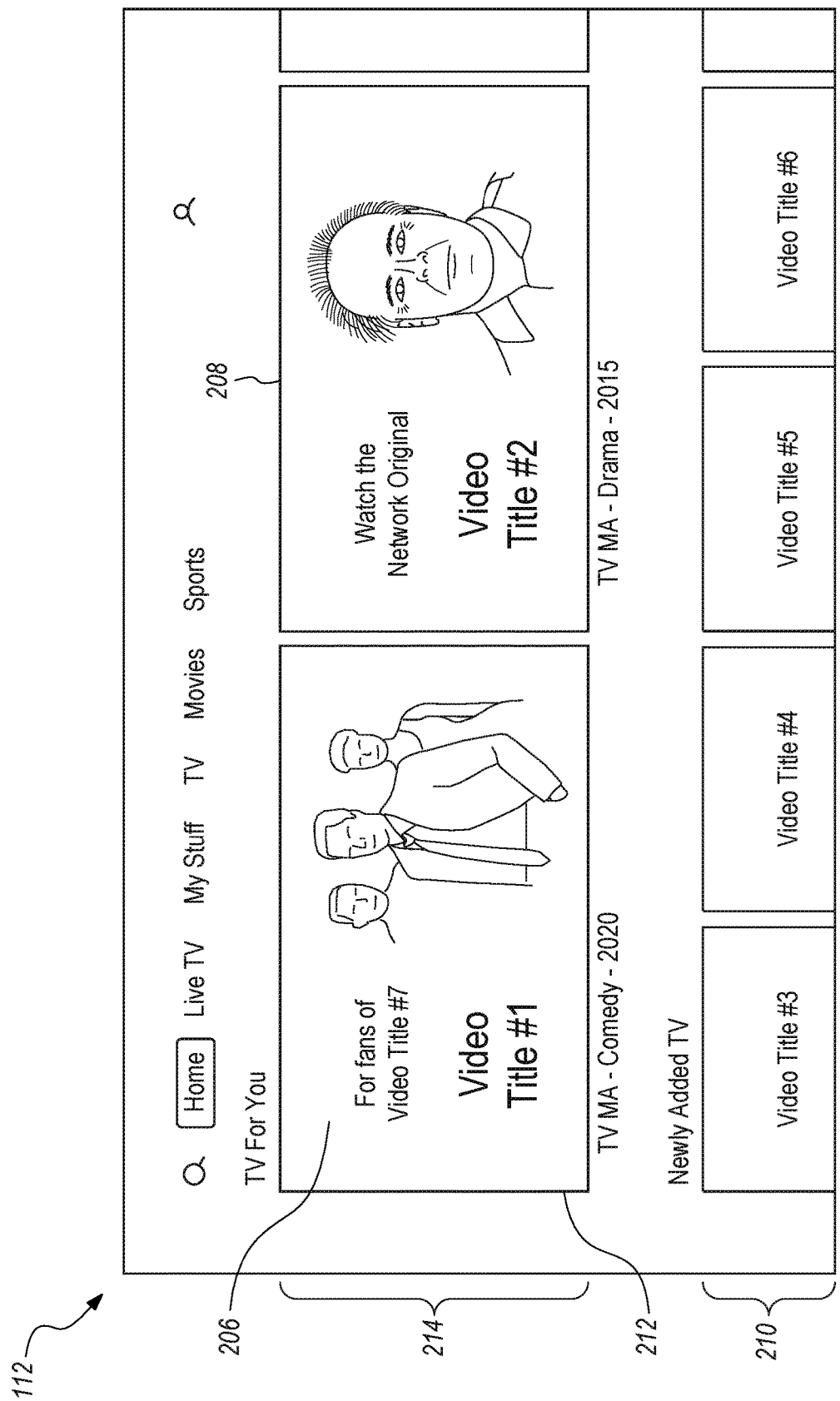
FIG. 2B depicts an example of a second type of modular user interface according to some embodiments.
Figure 2C:
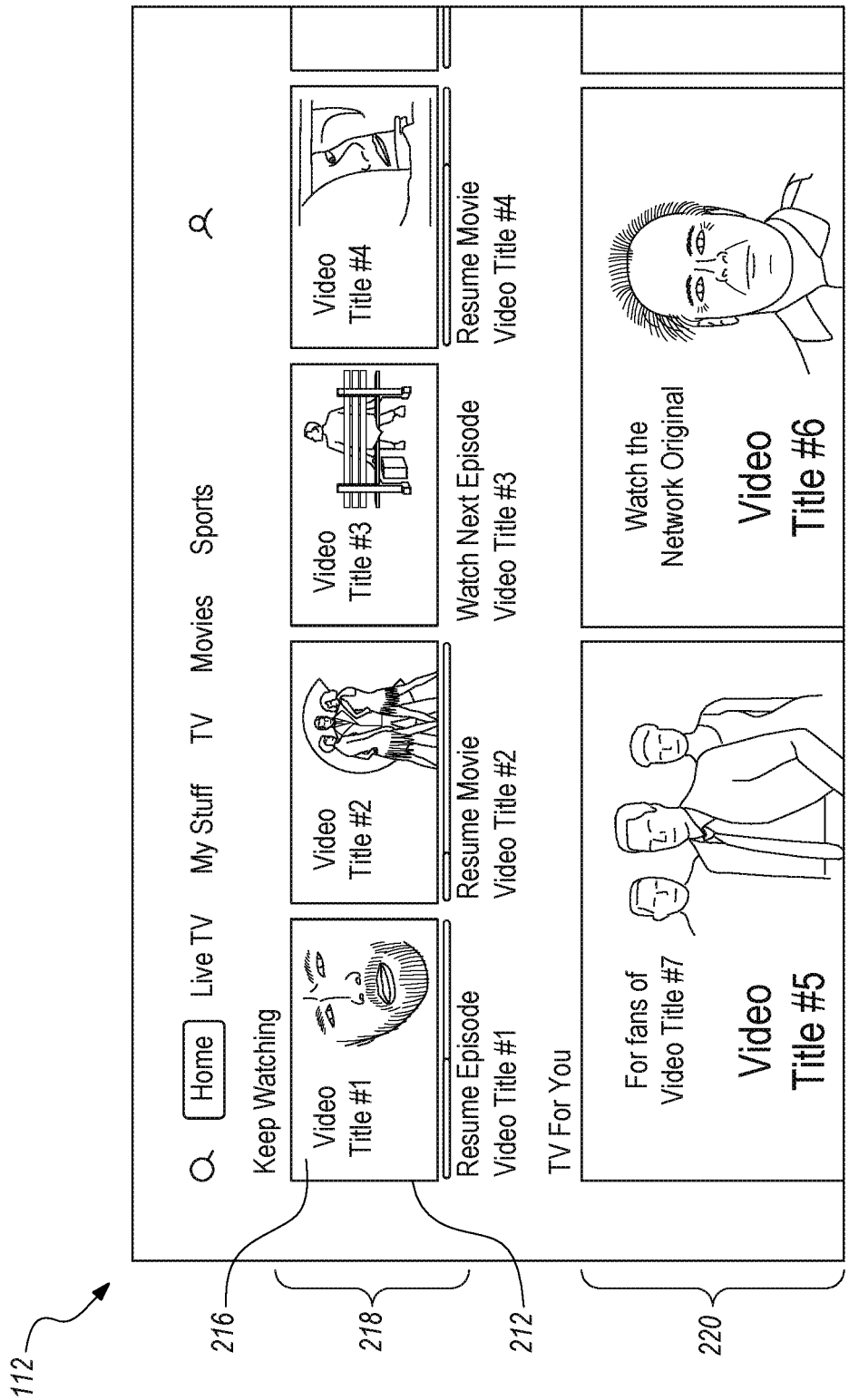
FIG. 2C depicts an example of a third type of modular user interface according to some embodiments.

FIGS. 2A-2C depict different examples of modular user interfaces 112 according to some embodiments. Although these examples are discussed, other examples may be appreciated. Different types of content are represented differently in user interface 112 with different icons and images.

FIG. 2A depicts an example of a first type of modular user interface according to some embodiments. User interface 112 may allow a user to scroll through a collection of videos. A tile may be an area of interface 112 that encompasses an instance of content, such as a movie or show. A selector may be used to select a video, such as a focus of the selector may be moved to select the video in a tile.

User interface 112 may display a collection using a first theme, such as a high emphasis theme. The high emphasis theme displays a video that is the focus of the selector. For example, a video at 202 is displayed when selected by the selector. The high emphasis theme may be applied to collections that may be considered more relevant for users than other collections. The determination may be based on characteristics of a single user account or multiple user accounts so that collections that are highly relevant to the single user account or multiple user accounts are given more emphasis on screen.

User interface 112 displays an additional collection at 204 that is not the focus of the selector, and other additional collections (not shown) may be displayed on interface 112.

The additional collections may be displayed using different themes or the same high emphasis theme. At 204, the collection is displayed with a standard emphasis theme, which displays tiles for videos with less information compared to the tiles in the high emphasis theme.

In some embodiments, user interface 112 may display a video using more area when using the high emphasis theme compared to other themes. For example, the video at 202 is displayed in a larger area than other videos shown at 204. The larger area may allow the high emphasis theme to display more information than other themes, such as one or more of a combination of a title, a description of the video, metadata associated with the video, a recommendation reason, and an image from the video. The high emphasis theme may also provide different options that may not be displayed in other themes, such as "Watch Now" and "Details", that can be selected to perform an action. A selection of the Watch Now button may start playback of the video. A selection of the Details button may display more details for the video. Other features or information may be displayed for a video in the high emphasis theme.

Because a tile for a video uses more area on user interface 112, the high emphasis theme may display fewer videos than the other themes on screen. For example, a collection at 204 has at least four videos being currently displayed in user interface 112, which is more than the one video that is displayed at 202. In some embodiments, the high emphasis theme only displays a single video for a collection in the onscreen (e.g., visible) area of interface 112; however, different numbers of videos may be displayed. Also, a collection with the high emphasis theme may have fewer videos in the collection than other collections that are associated with other themes. For example, the collection for a high emphasis theme may only include one video while lower emphasis themes may display more than one video. However, other numbers of videos may be used, such as the collection may display only one video, but other videos may be displayed at 202 using a scrolling mechanism that scrolls to other videos in the collection. The display of fewer videos and in a different area may emphasize the videos to a user account making the videos easier to see and also provide more information about the videos. If these videos are considered more relevant to a user account, then the videos are presented in a way that the user account can find the videos more easily and also view more information about video. Also, the contrast between the videos in the high emphasis theme compared to lower emphasis themes further emphasizes the videos because user accounts can recognize which videos are being emphasized with higher emphasis.

FIG. 2B depicts an example of a second type of modular user interface according to some embodiments. For example, the theme may be referred to as a medium emphasis theme.

In operation, a selector 212 may highlight an entity on user interface 112 that is currently selected within a first collection at 214. The collection may include at least three videos in these tiles, with two videos fully shown at 206 and 208. User interface 112 includes a second collection at 210, which includes other videos.

The first collection is displayed with a theme, such as a medium emphasis theme, that is lower in priority than the high emphasis theme. The medium emphasis theme displays a video that is the focus of selector 212 at 206. The medium emphasis theme may display a tile for the video in less area than a tile in the high emphasis theme. For example, the tile in the medium emphasis theme is smaller than the tile in the high emphasis theme. Also, the medium emphasis theme may display less information in a tile, but may display the same amount of information as the high emphasis theme (however in a smaller area). The displayed information may be one or more of a title, some metadata about the video, an image for the video, and a recommendation reason. The metadata may be the parental rating, genre, year of release, etc. The medium emphasis theme may not display some information that is displayed in the high emphasis theme, such as granular options to select the video for playback and text describing the plot of the video. However, a selection of the tile itself may cause playback of the video and/or display of additional information. Additional videos in the collection, such as the video at 208, are displayed in tiles similar to the tile that is subject to the focus of the selector.

At 210, user interface 112 displays the second collection with an example, of a third theme. FIG. 2C depicts an example of a third type of modular user interface according to some embodiments. A third theme may be referred to as a standard emphasis theme in user interface 112. The standard emphasis theme may be a default theme that is applied to a collection if no other themes with a higher emphasis apply or if a theme is not specified to modular interface application 110. However, other methods of determining when to apply the standard emphasis theme may be used.

A collection at 218 has the standard emphasis theme applied. User interface 112 displays another collection with another theme at 220, such as the medium emphasis theme.

The standard emphasis theme displays a video in a tile at 216 that is the focus of selector 212. The standard emphasis theme may display a tile in less area and with less information than the high emphasis theme and the medium emphasis theme. For example, the standard emphasis theme may display a title and a smaller image for the video, but with less metadata about the video. Also, in addition to no metadata, no options are provided for playback and text describing the plot of the video. However, a selection of the tile may be received to cause playback and/or display of additional information.

The different themes are displayed in different sized areas and may include different amounts of information, which may allow user interface 112 to display different numbers of videos in collections on the visible screen. For example, the standard emphasis theme may display the most videos in user interface 112 for the collection, the medium emphasis theme displays the second most videos for the collection, and the high emphasis theme displays the fewest videos for the collection. The larger number of videos that are displayed on the visible screen gives a user account more visible choices. However, when fewer videos are displayed, more information about the videos may be displayed to allow the user account to view more details about a video that may be of more interest to the user. Also, displaying the videos in larger tiles may provide more emphasis to the user account. The use of larger area for tiles in higher emphasis themes assigns more valuable user interface space to collections that may be more relevant to a user. For example, if a high emphasis theme is used, it may be considered to include the videos that are considered to be more relevant to the user and more likely to be selected. The additional information is displayed to provide more context on the videos and also the video is easier to find because the tile is larger. The lower emphasis themes may include videos that are considered less relevant and more videos may be shown in smaller tiles with less information where a user account can scroll through the videos.

Selection of Collections and Themes

In some embodiments, modular interface engine 108 may use a classification system to classify a collection with a theme. The classification system may classify a collection in a theme using different methods as described below. When modular interface engine 108 determines a theme for a collection, modular interface engine 108 sets the theme that is applied to the collection.

User interface 112 may be configured to allow a collection to be changed among the different themes. For example, user interface 112 may display a collection in the high emphasis theme at first. However, user interface 112 may be changed to display the collection in another emphasis, such as the medium emphasis theme. In some embodiments, the design of modular interface application 110 may use a variable that is associated with different areas of user interface 112 that will display collections. Modular interface application 110 includes logic to display different themes in a template area.

Figure 3:
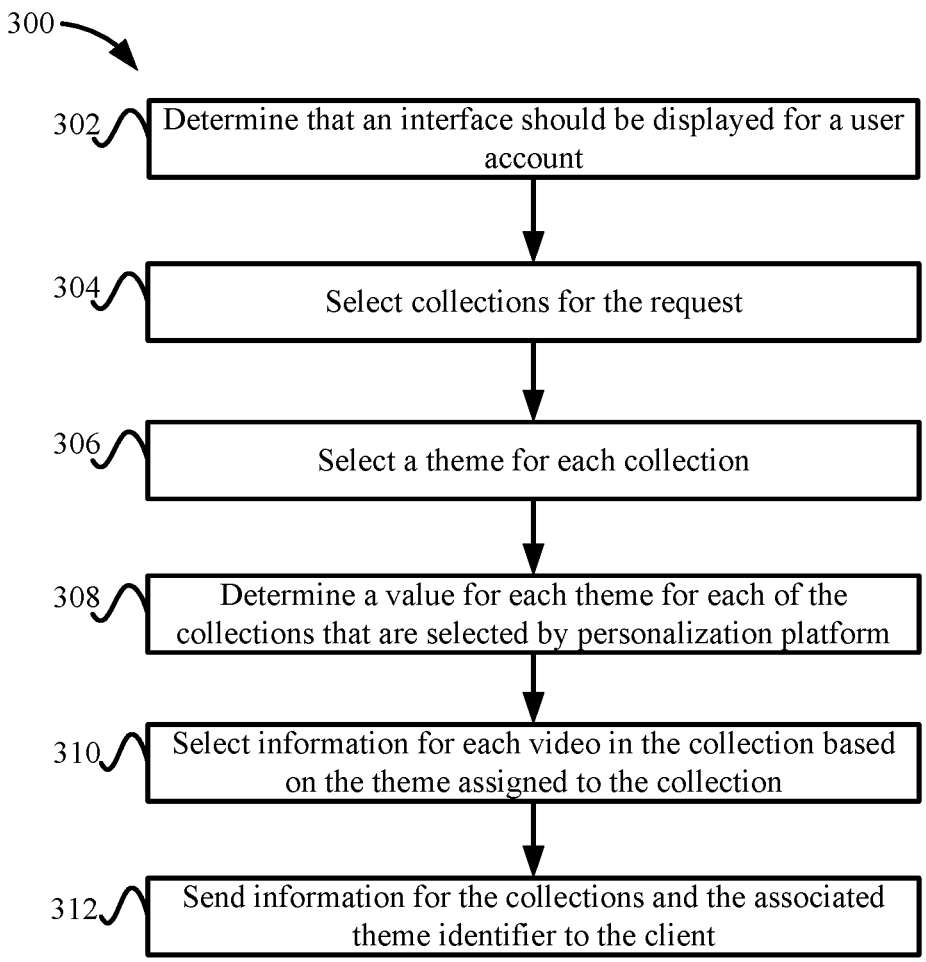
FIG. 3 depicts a simplified flowchart of a method for selecting a theme for a collection according to some embodiments.

The following will describe the selection of collections and associated themes at server system 102. FIG. 3 depicts a simplified flowchart 300 of a method for selecting a theme for a collection according to some embodiments. At 302, modular interface engine 108 determines that an interface should be displayed for a user account and determines a context for the user account. For example, the user account may log into modular interface application 110, navigate to a section or page, refresh the application, or perform any action that requires the display of user interface 112. The context may include information about the user account, the playback session, etc. For example, the context may be the watch history of a user account; preferences (for genres, segments, etc.) of the user account; personal characteristics and demographics for the user account; and expressed preferences (such as selections during registration of genres, ratings of watched videos, etc.).

At 304, personalization platform 114 selects collections for the request. The collections may be personalized for the user account that sent the request or may be globally selected for multiple user accounts. Personalization platform 114 may use the context to select the collections that may be of interest to the user account. For example, personalization platform 114 may recommend collections based on characteristics associated with a user. Also, personalization platform 114 may analyze historic trends in engagement with content from similar user accounts to generate recommendations for collections that are predicted to be of interest to the user account.

At 306, personalization platform 114 selects a theme for each collection. To assign a theme to a collection, personalization platform 114 may receive input, such as the context from the user account, analyze the input, and output a theme for a collection. For example, feedback from the performance of a collection and different themes may be received, such as click through rate, hours per visitor, or titles per visitor. The feedback may be from this user account and/or other user accounts. The feedback may be measured based on outputting the collection in a theme, such as a clickthrough rate that measures whether a user account selected the collection, hours per visitor that measures a time a user account spent in a session, and titles per visitor that measures a number of titles that are selected during a session. Personalization platform 114 may compare the metrics for different themes and select a theme that performed better than other themes for a collection. Also, personalization platform 114 may compare a metric to a threshold, and when the threshold is met, personalization platform 114 classifies the collection into a respective theme. Different themes may have different thresholds, and collections may meet different thresholds to be classified in different themes. For example, when the clickthrough rate for a collection meets a first threshold, personalization platform 114 may change the collection from a standard emphasis theme to a medium emphasis theme. Then, when the clickthrough rate for a collection meets a second threshold, personalization platform 114 may change the collection from the medium emphasis theme to a high emphasis theme. Accordingly, personalization platform 114 may use a past propensity to engage with a particular theme. That is, some user accounts may be more likely to respond well to particular themes. Also, personalization platform 114 may use known preferences and engagement patterns with particular themes. For example, personalization platform 114 may have a rule that states user accounts who like Anime may respond well to seeing Anime collections.

Also, personalization platform 114 may generate the relevancy for a collection and compare the relevancy value to different thresholds for the themes. Personalization platform 114 applies the theme for whichever threshold is met to the collection. Accordingly, personalization platform 114 could increase an emphasis for a theme to enlarge recommendations that are considered the most relevant. Also, a prediction network may receive features associated with the collection and classify the collection with a theme. Other methods may also be used, such as receiving an input that specifies the theme for a collection. Personalization platform 114 may also factor for the surrounding themes in selection of a given collection's theme. For example, if all surrounding collections have the same emphasis theme, the user account may not notice the most relevant collection, so personalization platform 114 could deemphasize the surrounding themes. Additionally, personalization platform 114 may use settings for themes that are already set for particular areas of user interface 112. For example, if a home page of a user account already has many programmed high emphasis themes or medium emphasis themes collections, personalization platform 114 may select a higher density theme, such as the standard emphasis, to provide variation of the collections on the page.

The above personalization is different than selecting videos to include in collections. Rather, the personalization is based on selecting themes for collections to improve the relevance of the display of the collections.

At 308, modular interface engine 108 determines a value for each theme for each of the collections that are selected by personalization platform 114. For example, modular interface engine 108 may associate a designated value for a theme identifier with identification information for a collection. The theme identifier may use different formats, such as strings, numbers, etc. In a simplified example, the them identifier may be "theme=1" for a high emphasis theme, "theme=2" for a medium emphasis theme, and "theme=3" for a standard emphasis theme. Other identifiers may be used, such as strings that identify the theme. It is noted that a theme may use different formats, such as medium emphasis theme may use a horizontal format and a vertical format. The horizontal format may be used on a first device type, such as a living room device, and the vertical format may be used on a second device type, such as a mobile device. In this case, the theme may include multiple identifiers that can identify the different formats.

At 310, modular interface engine 108 may select information for each video in the collection based on the theme assigned to the collection. As discussed above, the different themes may display different information for a video. Modular interface engine 108 may collect the applicable information that is needed for a theme for each video. In other embodiments, client 104 may send all the information for a video that is needed for all themes, and client 104 selects the information to display. Also, client 104 may have previously downloaded all the information and modular interface engine 108 may not have to select the information for the videos to send to client 104.

At 312, modular interface engine 108 sends information for the collections and the associated theme identifier to client 104. The information for the collections may send identifiers for the videos in the collection. Also, the information may include all the information needed to display the video or client 104 may already have downloaded the information.

Modular interface engine 108 may cause the change in theme by sending a modular interface command to modular interface application 110 either in response to a request (e.g., on a screen refresh) or by pushing the change without receiving a request. The change in theme may require additional information to be sent for the collection if the theme is increased to a higher emphasis theme. If the theme is lowered to a lower emphasis theme, user interface 112 may have the required information to display the collection for the new theme because the lower emphasis theme displays less information than the high emphasis theme; however, additional information could be sent for a lower emphasis theme.

Collection and Theme Display at the Client

Figure 4:
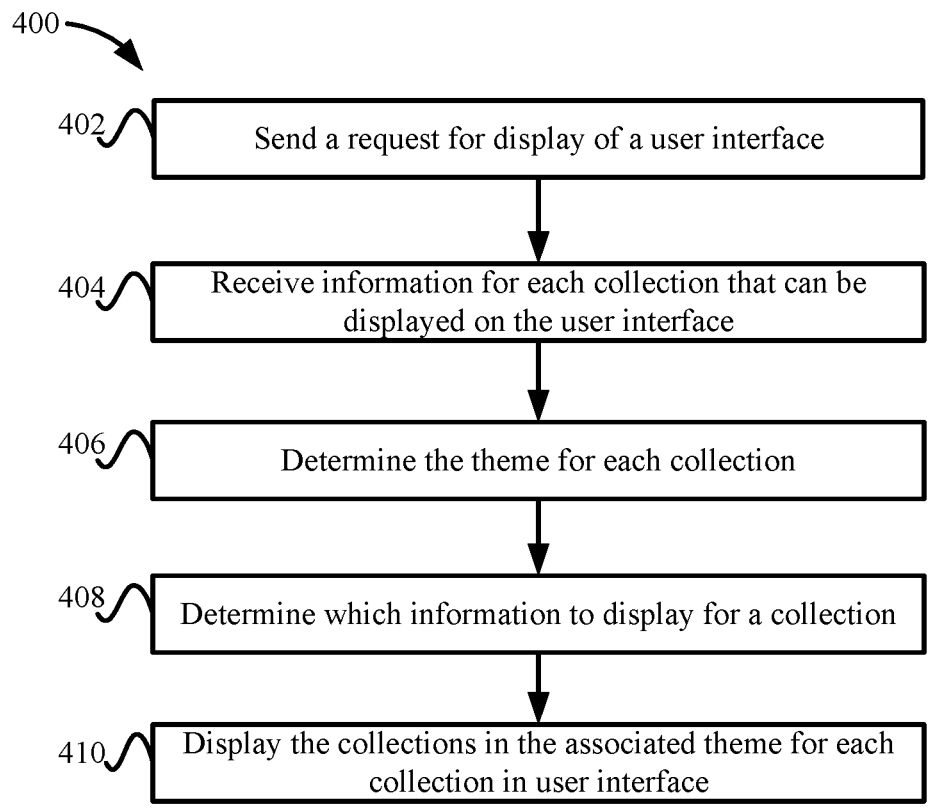
FIG. 4 depicts a simplified flowchart of a method for displaying collections with associated themes according to some embodiments.

When a collection is to be displayed in user interface 112, modular interface application 110 determines the value of the variable for the collection and displays the collection using the associated theme. FIG. 4 depicts a simplified flowchart 400 of a method for displaying collections with associated themes according to some embodiments. At 402, modular interface application 110 at client 104 sends a request for displaying user interface 112. For example, client 104 may send a request for an area of user interface 112, such as sections where content for collections should be displayed. For example, client 104 sends a request upon initialization of client 104 (e.g., at login), or on demand before a collection is displayed on user interface 112.

At 404, modular interface application 110 receives information for each collection that can be displayed on user interface 112. As discussed above, modular interface engine 108 selects the theme for a collection, adds an identifier for the collection, and, if needed, includes the information needed to display the collection.

At 406, modular interface application 110 determines the theme for each collection. For example, each collection may be associated with a theme identifier. Client 104 may determine which theme identifier of the value "1", "2", or "3" is received for each collection.

At 408, modular interface application 110 determines which information to display for a collection. For example, client 104 may receive the information for the collection that is required to display the collection in the response from modular interface engine 108. In other embodiments, modular interface application 110 may receive (or previously received) information for the theme and/or all the possible themes that could be displayed for a collection. For example, client 104 receives information needed for each theme such that modular interface application 110 may dynamically switch between themes that are displayed for a collection. Modular interface application 110 may use the identifier for the collection and the theme identifier to determine which information to display for each video in the collection.

At 410, modular interface application 110 displays the collections in the associated theme for each collection in user interface 112. For instance, modular interface engine 108 may display the collection of "Movies" with a high emphasis theme if the theme identifier for the collection is the value of "1". Also, modular interface engine 108 may display the collection of "Movies" with a medium emphasis theme if the theme identifier for the collection is the value of "2".

The themes may require different areas on user interface 112 to display the collections. The templates of user interface 112 are configured to expand in size or contract in size based on the theme that is being used in respective templates. The layout of user interface changes, but does not require an update of the software code. This improves the functionality of the user interface by allowing changes to themes without requiring manual changes to the software code. Rather, changes can be sent to user interface 112 and user interface 112 can change a theme for a collection upon refreshing or redisplaying the user interface.

Personalization

Modular interface engine 108 may personalize the collections using the themes for different user accounts, different client device types, different users, etc. For example, the themes may be arranged in a hierarchy based on a criteria, such as importance, device capabilities, etc. For example, some clients 104 may be able to display one theme, but not another, based on capabilities of the device type. That is, a living room device may have the capability to display the high emphasis theme, but a mobile device does not have that capability due to the limited space on the user interface. Accordingly, the themes may be associated with capabilities and each type of client device 104 may be assigned one or more capabilities. When modular interface application 110 is going to display a collection, modular interface application 110 determines the capabilities of the associated client 104. Then, modular interface application 110 sends the capabilities to modular interface engine 108. In other embodiments, modular interface engine 108 may already know the capabilities of client 104.

When it is time to send a command to display a collection, modular interface engine 108 determines the hierarchy for the collection. For the highest ranked theme in the collection, modular interface engine 108 determines if client 104 supports the capabilities for the theme. If so, modular interface engine 108 selects that theme and sends the identifier for that theme to modular interface application 110. If not, modular interface engine 108 performs the process with the next highest ranked theme in the hierarchy. Modular interface engine 108 may continue to test themes until a default theme (e.g., standard emphasis theme) at the end of the hierarchy is reached and that theme is selected and sent to modular interface application 110. The capabilities are considered because some client types may not be able to support the display of a theme. For example, a device may not be able to support features of the high emphasis theme, which previews a video in user interface 112, but may be able to support a standard emphasis theme, which displays a static image.

In another personalization aspect, when making recommendations for content or collections, personalization platform 114 may provide explanations for why the system is making the recommendations based upon what is known about the content and the user account. Personalization platform 114 may determine the explanations by reviewing contextual information from the content and the user account. For example, personalization platform 114 reviews metadata that is known about the content, including key features such as directors, actors, awards, genres, etc. Also, personalization platform 114 reviews insights that are determined about the user account, such as the past consumption or preferences for particular directors, actors, awards, or genres for the user account. Personalization platform 114 also may adjust the explanation based on the analysis, such as by emphasizing a director that is preferred by the user account. Also, the tile size for themes may vary and the amount of text for a recommendation may vary. Accordingly, personalization platform 114 may include more explanation (e.g., text) for a recommendation in a higher emphasis theme and less explanation in a lower emphasis theme.

Personalization platform 114 can cross reference content to other items. For example, personalization platform 114 can cross reference content to a fan of an Actor #1 by telling the user account that the actor starred in a particular program. Similarly, personalization platform 114 can encourage a user who watched a Movie #1 to watch a Movie #2, which may be a similarly themed program watched by a similar subset of users. While these examples are at the content level, these explanations would be similar for content categories—when personalization platform 114 suggests a collection of superhero movies to a user account, personalization platform 114 can explain the recommendation is based on the viewing of a specific superhero movie. The information that personalization platform 114 determines may determine which theme is used. For example, if personalization platform 114 determines that there is a reason for recommending content, modular interface engine 108 may select the medium emphasis theme, which includes the reason in the display of the content tile.

Theme Configuration on Different Device Types

Different types of devices may display the themes differently. The types of clients 104 in which interface 112 are displayed may be living room devices, mobile devices, and web client devices, but other types of devices may be appreciated. Modular interface engine 108 may assign different themes to a collection that is displayed on different client device types. Also, modular interface application 110 may assign the same theme to different client device types if both client device types are configured to display the theme.

Given the different dimensions of the screens of different client device types, the layouts of a theme may be different. The living room device type may include horizontal tiles that can be scrolled horizontally. For shows with multiple episodes, an initial image may be series art of the series and when focus selects the image, the state changes to an image for an episode. The mobile device type may include a vertical tile with a peeking tile that overlaps the vertical tile. Other tiles are included in the column. The tile provides a primary action of go-to details about the video, a secondary action of playing the video, and an optional action of jumping to the end of the collection. The web client device type includes horizontal images that can be scrolled horizontally. For shows with multiple episodes, an initial image may be series art of the series and when selector 212 selects the image, the state changes to an image for an episode.

Modular interface engine 108 may allow different layouts to be used on each device type. Modular interface engine 108 can adjust the layout and then store the layout with a theme that can be later used. The configuration may also be set per collection. For example, modular interface engine 108 may manage how each collection and the content within the collections are presented to users on living room devices, mobile devices, and web devices. In some examples, modular interface engine 108 can configure the form/shape of the tiles in a collection, the size/emphasis of the tiles in a collection, the metadata displayed for videos in a collection, and the actions (e.g., Play, Go to Details, Add, Remove) a user account can take for the videos in a collection.

FIGS. 5A and 5B depict different examples of personalized modular user interfaces 112 according to some embodiments. User interface 112 may display five collections differently in user interface 112-1 in FIG. 5A and user interface 112-2 in FIG. 5B. User interface 112-1 and user interface 112-2 may be associated with the same user account or different user accounts, and may be the same device type or different device types. Also, user interface 112-1 and user interface 112-2 may be displayed on the same client 104, but user interface is dynamically changed over a time period.

In FIG. 5A, user interface 112-1 displays a collection #1 at 502-1 with a high emphasis, a collection #2 at 502-2 with a low emphasis, a collection #3 at 502-3 with a high emphasis, a collection #4 at 502-4 with a medium emphasis, and a collection #5 at 502-5 with a low emphasis. In FIG. 5B, modular interface engine 108 may change at least some of the themes that are applied to the collections. For example, user interface 112-2 displays a collection #1 at 502-1 with a high emphasis, a collection #2 at 502-2 with a medium emphasis, a collection #3 at 502-3 with a low emphasis, a collection #4 at 502-4 with a high emphasis, and a collection #5 at 502-5 with a low emphasis. Modular interface engine 108 may make the changes for the same user account or across different user accounts. For example, modular interface engine 108 may change the themes at different times of the day for the same user account based on a condition, such as what a user account prefers to watch at different times. Also, modular interface engine 108 may change the themes for a user account based on device types or other factors. Modular interface engine 108 may also change the theme for different user accounts, such as modular interface engine 108 may determine that different user accounts may prefer different collections.

Also, modular interface engine 108 may create a dedicated placement (not shown) according to some embodiments. A dedicated placement may be an area that is reserved for the specified content. This allows editors, advertisers, and the recommendation engine to dynamically disperse content spotlights, ad insertions, live events, product tutorials, etc. throughout the user interface 112. Modular interface engine 108 allows flexibility for editors, advertisers, and the recommendation algorithm to dynamically program user targeted content/ads using the dedicated placements. The dedicated placements may help break the tile fatigue in a user account's experience.

Conclusion

Accordingly, the modular user interface may personalize the content that is provided in the types of content and how the content is presented. Modular interface application 110 is configured to support the display of multiple themes for a collection without changing any software code. The design allows dynamic change of the layout of user interface 112 when the user interface is refreshed or when different portions of the user interface are displayed, or over multiple sessions.

EXAMPLE EMBODIMENTS

In some embodiments, a method comprising: selecting, by a computing device, a context for a user account; selecting, by the computing device, a plurality of collections for an interface, wherein a collection includes a set of videos; selecting, by the computing device, a theme from a plurality of themes for a collection in the plurality of collections based on the context, wherein the plurality of themes apply different display formats to the collection; and sending, by the computing device, an identifier for the theme and information for the collection to a client device being used by the user account to indicate to the interface the theme to use to display the collection with the plurality of collections.

In some embodiments, selecting the plurality of collections comprises selecting the collection based on the context for the user account.

In some embodiments, the collection is selected based on a relevancy to the user account.

In some embodiments, selecting the theme for the collection comprises: selecting the theme based on a characteristic of the collection and the context of the user account.

In some embodiments, selecting the theme for the collection comprises: selecting the theme based on a relevancy of the theme to the context of the user account.

In some embodiments, selecting the theme for the collection comprises: selecting the theme based on a theme applied to another collection in the plurality of collections, wherein the theme is selected to vary themes on the interface.

In some embodiments, selecting the theme for the collection comprises: selecting the theme based on information from another user account that engaged with the collection that used the theme, wherein the another user account is considered similar to the user account.

In some embodiments, selecting the theme for the collection comprises: reviewing a hierarchy of ranked themes; and selecting a highest ranked theme in the hierarchy that is compatible with a capability of a device being used by the user account.

In some embodiments, the method further comprising: selecting the identifier for the theme from a plurality identifiers, wherein the plurality of themes are associated with the plurality of identifiers.

In some embodiments, the method further comprising: selecting the information for the collection based on a requirement of the theme.

In some embodiments, different information is selected for the collection for different themes in the plurality of themes.

In some embodiments, the interface is configured with templates to apply the plurality of themes to a template.

In some embodiments, the templates change an area in the interface based on which theme in the plurality of themes is applied to the collection being displayed in the template.

In some embodiments, a non-transitory computer-readable storage medium containing instructions, that when executed, control a computer system to be operable for: selecting a context for a user account; selecting a plurality of collections for an interface, wherein a collection includes a set of videos; selecting a theme from a plurality of themes for a collection in the plurality of collections based on the context, wherein the plurality of themes apply different display formats to the collection; and sending an identifier for the theme and information for the collection to a client device being used by the user account to indicate to the interface the theme to use to display the collection with the plurality of collections.

In some embodiments, a method comprising: receiving, by a computing device, a plurality of collections for an interface, wherein a collection includes a set of videos; receiving, by the computing device, an identifier to apply to a theme for a collection in the plurality of collections, wherein the theme is selected from a plurality of themes that apply different display formats to the collection; selecting, by the computing device, information for the collection based on the theme; and displaying, by the computing device, the information for the collection using the theme in the interface with the plurality of collections, wherein the plurality of themes display the collection using different display formats.

In some embodiments, the theme comprises a first theme and the identifier comprises a first identifier, the method further comprising: receiving a second identifier for a second theme for the collection; and changing a display of the collection from the first theme to the second theme in the interface, wherein the second theme displays the collection in a different display format from the first theme.

In some embodiments, the collection is displayed in a template of the interface, and the template is configured to display the collection using different themes in the plurality of themes.

In some embodiments, the template can display themes in different sizes on the interface.

In some embodiments, the theme for the collection is alterable without reprogramming an application that is used to display the collection on the interface.

In some embodiments, selecting the information for the collection comprises: selecting which information to display for the collection based on a requirement of the theme.

System

Figure 6:
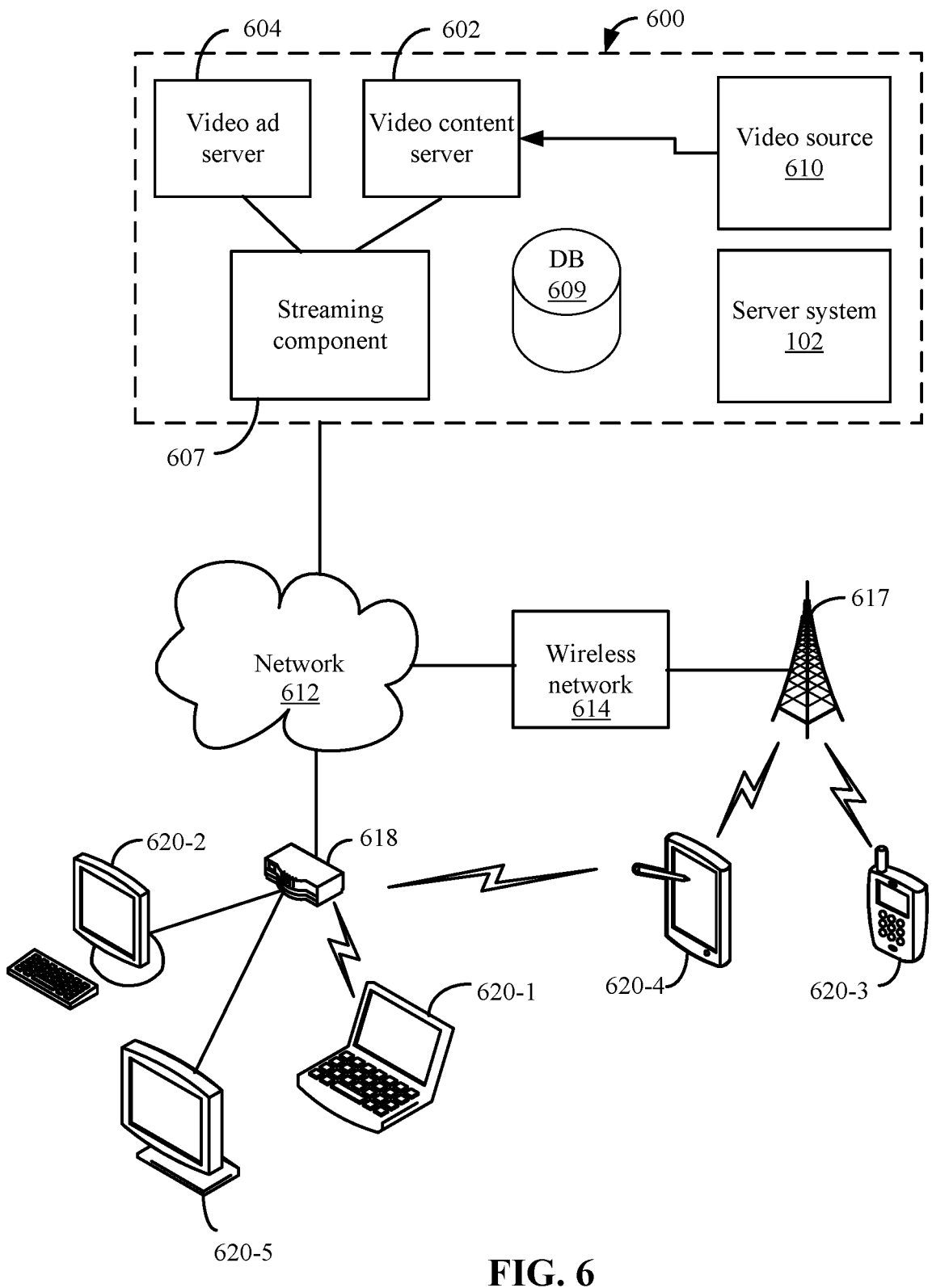
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 600, a public service message, or some other information. The video advertising server 604 may serve the video advertising segments as directed by a user interface controller (not shown).

The video streaming system 600 also may include server system 102.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612, wireless cellular telecommunications network 614, and/or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless cellular telecommunications network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HyperText Transfer Protocol (HTTP) and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
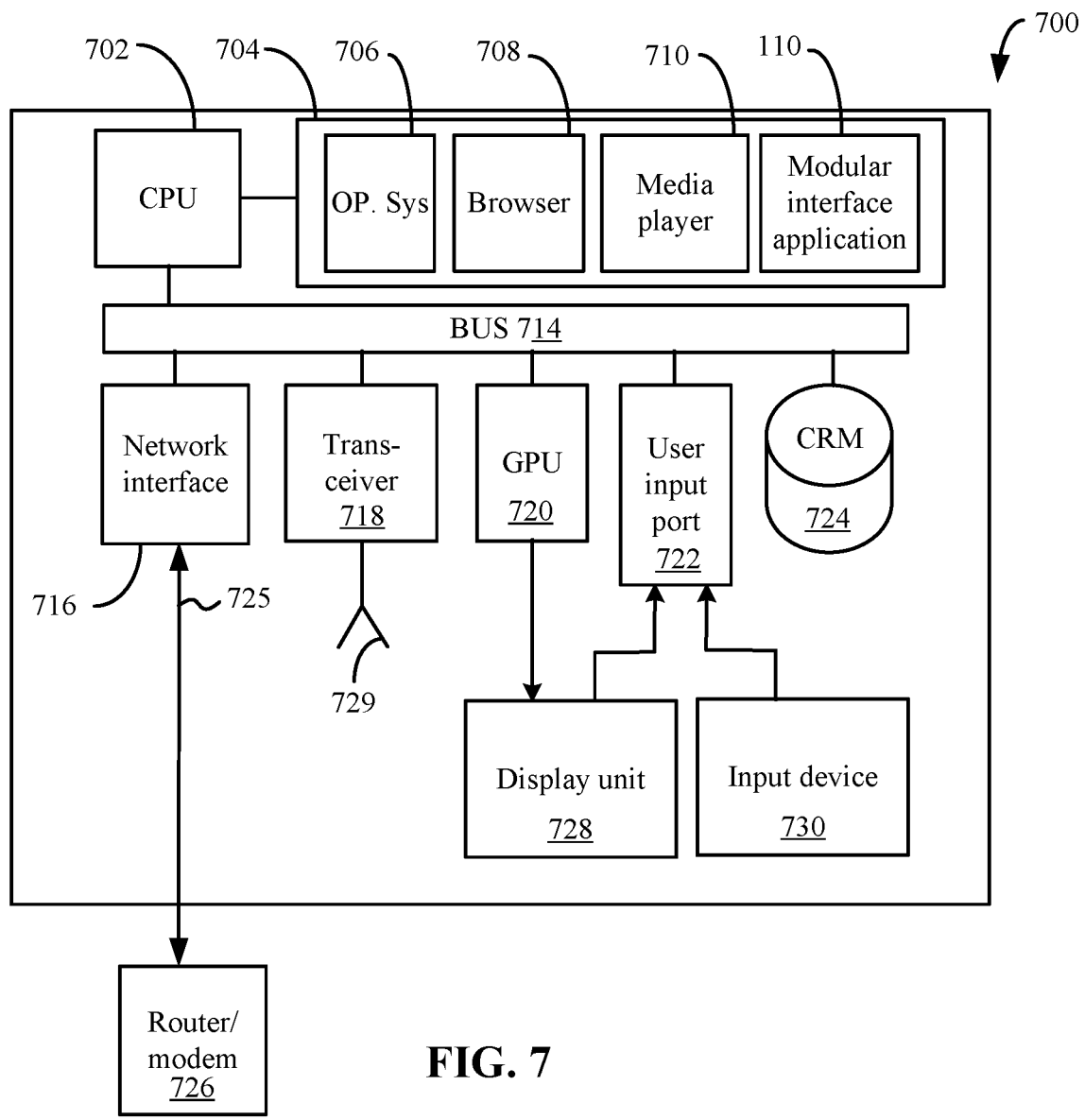
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further include modular interface application 110. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured or operable to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured or operable to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera, or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   selecting, by a computing device, a context for a user account;
   selecting, by the computing device, a plurality of collections for an interface, wherein a collection includes a set of videos;
   selecting, by the computing device, a theme from a plurality of themes for a collection in the plurality of collections based on the context, wherein the plurality of themes apply different display formats to the collection, wherein selecting the theme for the collection comprises:
    generating a relevancy value based on the context of the user account, wherein the relevancy value rates a relevancy of the collection to the user account;
    comparing the relevancy value to a threshold for the theme; and
    selecting the theme based on the relevancy value meeting the threshold for the theme; and
sending, by the computing device, an identifier for the theme and information for the collection to a client device being used by the user account to indicate to the interface the theme to use to display the collection with the plurality of collections.

2. The method of claim 1, wherein selecting the plurality of collections comprises selecting the collection based on the context for the user account.

3. The method of claim 2, wherein the collection is selected based on a relevancy to the user account.

4. The method of claim 1, wherein the relevancy value is based on a characteristic of the collection and the context of the user account.

5. The method of claim 1, wherein the theme comprises a first theme and the collection comprises a first collection, the method further comprising:
    selecting a second theme for a second collection based on a theme applied to another collection in the plurality of collections, wherein the second theme is selected to vary themes on the interface.

6. The method of claim 1, wherein the theme comprises a first theme and the collection comprises a first collection, the method further comprising:
    selecting a second theme for a second collection, wherein the second theme is selected based on information from another user account that engaged with the second collection that used the second theme, wherein the another user account is considered similar to the user account.

7. The method of claim 1, wherein the theme comprises a first theme and the collection comprises a first collection, the method further comprising:
    reviewing a hierarchy of ranked themes; and
    selecting a second theme in the hierarchy for a second collection, wherein the second theme is compatible with a capability of a device being used by the user account.

8. The method of claim 1, further comprising:
    selecting the identifier for the theme from a plurality identifiers, wherein the plurality of themes are associated with the plurality of identifiers.

9. The method of claim 1, further comprising:
    selecting the information for the collection based on a requirement of the theme.

10. The method of claim 1, wherein different information is selected for the collection for different themes in the plurality of themes.

11. The method of claim 1, wherein the interface is configured with templates to apply the plurality of themes to a template.

12. The method of claim 11, wherein the templates change an area in the interface based on which theme in the plurality of themes is applied to the collection being displayed in the template.

13. A non-transitory computer-readable storage medium containing instructions, that when executed, control a computer system to be operable for:
    selecting a context for a user account;
    selecting a plurality of collections for an interface, wherein a collection includes a set of videos;
    selecting a theme from a plurality of themes for a collection in the plurality of collections based on the context, wherein the plurality of themes apply different display formats to the collection, wherein selecting the theme for the collection comprises:
        generating a relevancy value based on the context of the user account, wherein the relevancy value rates a relevancy of the collection to the user account;
        comparing the relevancy value to a threshold for the theme; and
        selecting the theme based on the relevancy value meeting the threshold for the theme; and
    sending an identifier for the theme and information for the collection to a client device being used by the user account to indicate to the interface the theme to use to display the collection with the plurality of collections.

14. The non-transitory computer-readable storage medium of claim 13, wherein the relevancy value is based on a characteristic of the collection and the context of the user account.

15. A method comprising:
    receiving, by a computing device, a plurality of collections for an interface, wherein a collection includes a set of videos;
    receiving, by the computing device, an identifier to apply to a theme for a collection in the plurality of collections, wherein the theme is selected from a plurality of themes that apply different display formats to the collection by generating a relevancy value based on the context of a user account, wherein the relevancy value rates a relevancy of the collection to the user account; comparing the relevancy value to a threshold for the theme; and selecting the theme based on the relevancy value meeting the threshold for the theme;
    selecting, by the computing device, information for the collection based on the theme; and
    displaying, by the computing device, the information for the collection using the theme in the interface with the plurality of collections, wherein the plurality of themes display the collection using different display formats.

16. The method of claim 15, wherein the theme comprises a first theme and the identifier comprises a first identifier, the method further comprising:
    receiving a second identifier for a second theme for the collection; and
    changing a display of the collection from the first theme to the second theme in the interface, wherein the second theme displays the collection in a different display format from the first theme.

17. The method of claim 15, wherein:
    the collection is displayed in a template of the interface, and
    the template is configured to display the collection using different themes in the plurality of themes.

18. The method of claim 17, wherein the template can display themes in different sizes on the interface.

19. The method of claim 15, wherein the theme for the collection is alterable without reprogramming an application that is used to display the collection on the interface.

20. The method of claim 15, wherein selecting the information for the collection comprises:
  selecting which information to display for the collection based on a requirement of the theme.

* * * * *